United States Patent
Deshpande (10) Patent No.: US 7,340,746 B2
(45) Date of Patent: Mar. 4, 2008

(54) APPARATUS AND METHODS FOR PROVIDING COMMUNICATION BETWEEN SYSTEMS HAVING DIFFERENT PROTOCOL VERSIONS

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 845 days.

(21) Appl. No.: 10/637,408

(22) Filed: Aug. 7, 2003

(65) Prior Publication Data

US 2005/0034131 A1    Feb. 10, 2005

(51) Int. Cl.
G06F 9/44    (2006.01)
(52) U.S. Cl. ...................... 719/328; 709/236
(58) Field of Classification Search ................ 719/310, 719/313, 328; 709/200, 203, 220, 223, 227, 709/228, 230, 236, 238, 245, 249, 250; 703/2, 703/27; 370/392, 401, 464, 466
See application file for complete search history.

(56) References Cited

U.S. PATENT DOCUMENTS

| | | | | |
|---|---|---|---|---|
| 5,721,876 A | * | 2/1998 | Yu et al. | ........................ 703/27 |
| 5,774,660 A | * | 6/1998 | Brendel et al. | ............. 709/201 |
| 6,038,233 A | * | 3/2000 | Hamamoto et al. | ......... 370/401 |
| 6,118,784 A | | 9/2000 | Tsuchiya et al. | |
| 6,360,265 B1 | * | 3/2002 | Falck et al. | ................. 709/227 |
| 6,675,218 B1 | * | 1/2004 | Mahler et al. | .............. 709/230 |
| 7,072,338 B2 | * | 7/2006 | Tsuchiya et al. | ............ 370/392 |
| 2002/0021703 A1 | | 2/2002 | Tsuchiya et al. | |
| 2002/0021704 A1 | | 2/2002 | Tsuchiya et al. | |
| 2002/0021705 A1 | | 2/2002 | Tsuchiya et al. | |
| 2002/0021706 A1 | | 2/2002 | Tsuchiya et al. | |
| 2002/0024960 A1 | | 2/2002 | Tsuchiya et al. | |
| 2002/0136216 A1 | | 9/2002 | Tsuchiya et al. | |
| 2002/0136237 A1 | | 9/2002 | Tsuchiya et al. | |
| 2003/0165160 A1 | * | 9/2003 | Minami et al. | ............. 370/466 |

FOREIGN PATENT DOCUMENTS

| | | |
|---|---|---|
| EP | 0 840 482 | 5/1998 |
| EP | 1 087 575 | 3/2001 |
| JP | 11-136285 | 5/1999 |
| JP | 2000-253064 | 9/2000 |

(Continued)

OTHER PUBLICATIONS

"Transition Mechanisms for IPv6 Hosts and Routers," R. Gilligan, pp. 1-26, Aug. 2000.

(Continued)

*Primary Examiner*—Van H. Nguyen
*Assistant Examiner*—KimbleAnn Verdi
(74) *Attorney, Agent, or Firm*—Madson & Austin (57) ABSTRACT

A system for enabling an IPv4 (Internet Protocol version 4) application to communicate across a computer network with an IPv6 (Internet Protocol version 6) system. The system includes a computing device and executable instructions. Executable instructions are configured to make a function call to an IPv4 socket Application Programming Interface (API). The instructions translate the function call to a translated function call wherein the translated function call uses raw sockets. Another function call is made to the IPv4 socket API for the translated function call that uses raw sockets. A packet is passed to an IPv4 stack.

18 Claims, 6 Drawing Sheets

FOREIGN PATENT DOCUMENTS

| | | |
|---|---|---|
| JP | 2001-285366 | 10/2001 |
| WO | WO 01/22683 | 3/2001 |
| WO | WO 01/69887 | 9/2001 |
| WO | WO 02/073933 | 9/2002 |

OTHER PUBLICATIONS

"Dual Stack Hosts Using "Bump-in-the-API" (BIA)," Seungyun Lee et al., pp. 1-14, Apr. 2002.

"Dual Stack Hosts Using "Bump-in-the Stack" Technique (BIS)," K. Tsuchiya et al., pp. 1-12, Feb. 2000.

"Stateless IP/ICMP Translation Algorithm (SIIT)," E. Nordmark, pp. 1-23, Feb. 2000.

"IPv4-IPv6 Dual Stack Hosts Using the "Bump-In-the-Stack" Tchnique (BIS)," Yoshifumi Atarashi et al., IEICE Trans Commun., vol. E84-B, No. 8, pp. 1996-2000, Aug. 2001.

"The Migration from IPv4 to IPv6," Chapter 12, pp. 227-240.

H. Kitamura, NEC Corporation, "A SOCKS-based IPv6/IPv4 Gateway Mechanism," IETF Standard, Internet Engineering Task Force, IETF, CH, Apr. 2001.

\* cited by examiner

APPARATUS AND METHODS FOR PROVIDING COMMUNICATION BETWEEN SYSTEMS HAVING DIFFERENT PROTOCOL VERSIONS

TECHNICAL FIELD

The present invention relates generally to electronic communications via computer networks. More specifically, the present invention relates to apparatus and methods for providing communication between systems having different protocol versions.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Computer networks use rules governing the transmission and reception of data. These rules of the computer network are often referred to as a protocol. There are many different protocols that are being used today in combination with computer networks. One important protocol in use today is the Internet Protocol. The Internet Protocol is the network layer protocol in the TCP/IP communications protocol suite.

The current Internet Protocol version is known as IPv4 (IP Version 4). Because of the rapid growth of the Internet the IPv4 address space will eventually be exhausted. The new version of Internet Protocol is known as IPv6 (IP Version 6). IPv6 aims to provide increased functionality for computer network communications.

The migration from IPv4 to IPv6 will not be an immediate process, but will take some period of time to accomplish. As a result, there will be a transition period where some systems are using IPv4 and some systems are using IPv6. Thus during the transition period, the IPv4 and IPv6 protocols need to coexist.

As shown from the above discussion, there is a need for systems and methods that will enable the IPv4 and IPv6 protocols to coexist. Improved computer network systems and methods may enable these protocols to coexist and may also minimize some of the difficulties that may be experienced during the transition period. Benefits may be realized by providing increased functionality to assist in the transition from IPv4 to IPv6.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for a computer system for providing communication between a first system and a second system is disclosed. The first system uses a first version of a protocol and the second system uses a second version of the protocol. A first application is provided on the first system. A function call is made to a socket Application Programming Interface (API) for the first version. The function call is translated to a translated function call wherein the translated function call uses raw sockets. A function call is made to the socket API for the translated function call that uses raw sockets. A packet is passed to a stack for the first version of the protocol. The packet may be passed to a network card driver.

In one embodiment, the first version of the protocol is IPv4 (Internet Protocol version 4) and the second version of the protocol is IPv6 (Internet Protocol version 6).

The method disclosed may also include supplying IP headers. In one embodiment of the method the IP headers may be supplied only once.

The method may be implemented by inserting an API level translator layer between a socket API layer and a TCP/IPv4 layer. Further, the method may be implemented without using an IPv6 stack.

An alternate implementation for a reception-related IPv4 socket function may also be provided. In the alternate implementation an incoming packet is received on a raw socket. A source host is checked to determine the proper destination for the incoming packet. A port number is checked for the incoming packet. A transport and IP headers are stripped from the incoming packet. A payload is passed to a destination application. Tunneling of IPv6 packets over IPv4 routing infrastructure may also be performed.

A Name Resolver service may be used to perform name to address resolution related functions. The Name Resolver service may be configured to run on a separate host that includes an IPv4 stack and an IPv6 stack. Name to address resolution functions of the Name Resolver service may use the IPv6 stack. The Name Resolver service may be further configured to receive a query from the first system, use the address resolution functions to obtain a record and send the record to the first system.

An alternate implementation for a sending-related IPv4 socket function may be provided. In this alternate implementation an IPv4 socket API call may be intercepted to send a packet. The IPv4 socket API call is translated to use a raw socket. Transport and IPv6 headers are provided. A corresponding IPv4 socket API function is called for the raw socket and the packet is passed to the stack.

In some systems the packet may be fragmented. Moreover, the packet may be passed to a network card driver.

A set of executable instructions for implementing a method in an IPv4 (Internet Protocol version 4) computer system for providing communication between the IPv4 system and an IPv6 (Internet Protocol version 6) system is also disclosed. An IPv4 application is provided on the IPv4 system. A function call is made to an IPv4 socket Application Programming Interface (API). The function call is translated to a translated function call wherein the translated function call uses raw sockets. Another function call is made to the IPv4 socket API for the translated function call that uses raw sockets. A packet is passed to an IPv4 stack.

The method of the set of executable instructions may be implemented by inserting an API level translator layer between a socket API layer and a TCP/IPv4 layer. The executable instructions may be stored on a computer-readable medium.

A system for enabling an IPv4 (Internet Protocol version 4) application to communicate across a computer network with an IPv6 (Internet Protocol version 6) system is disclosed. The system includes a computing device and executable instructions. Executable instructions are configured to make a function call to an IPv4 socket Application Programming Interface (API). The instructions translate the function call to a translated function call wherein the translated function call uses raw sockets. Another function call is made to the IPv4 socket API for the translated function call that uses raw sockets. A packet is passed to an IPv4 stack.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
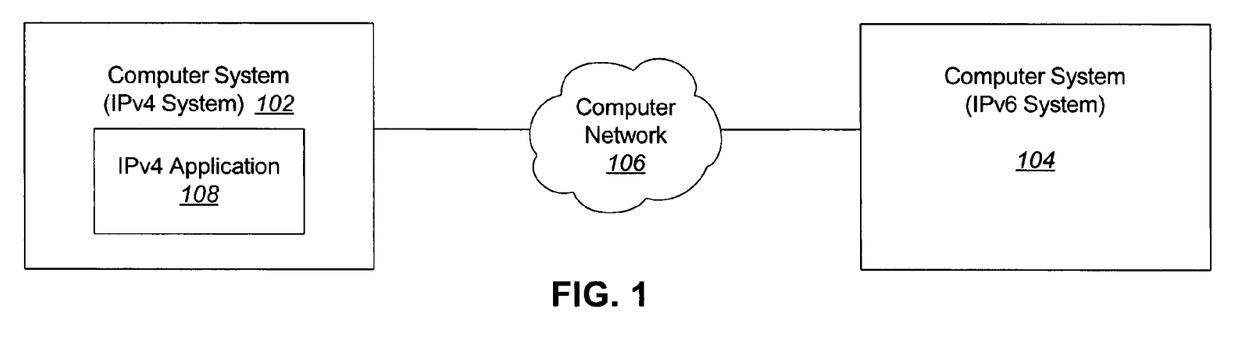
FIG. 1 is a block diagram illustrating two different systems communicating with one another over a computer network.

The Internet allows many different kinds of computers and computing devices to communicate with one another. Computers and computing devices on the Internet use the Internet Protocol to communicate with one another. FIG. 1 is a block diagram illustrating two different systems communicating with one another over a computer network. One system 102 illustrated in FIG. 1 uses the current Internet Protocol version known as IPv4 (IP Version 4). The other system 104 uses the new version of Internet Protocol known as IPv6 (IP Version 6). These systems may communicate with one another through a computer network 106. For purposes of illustration an IPv4 application 108 is shown on the IPv4 computer system 102.

Figure 2:
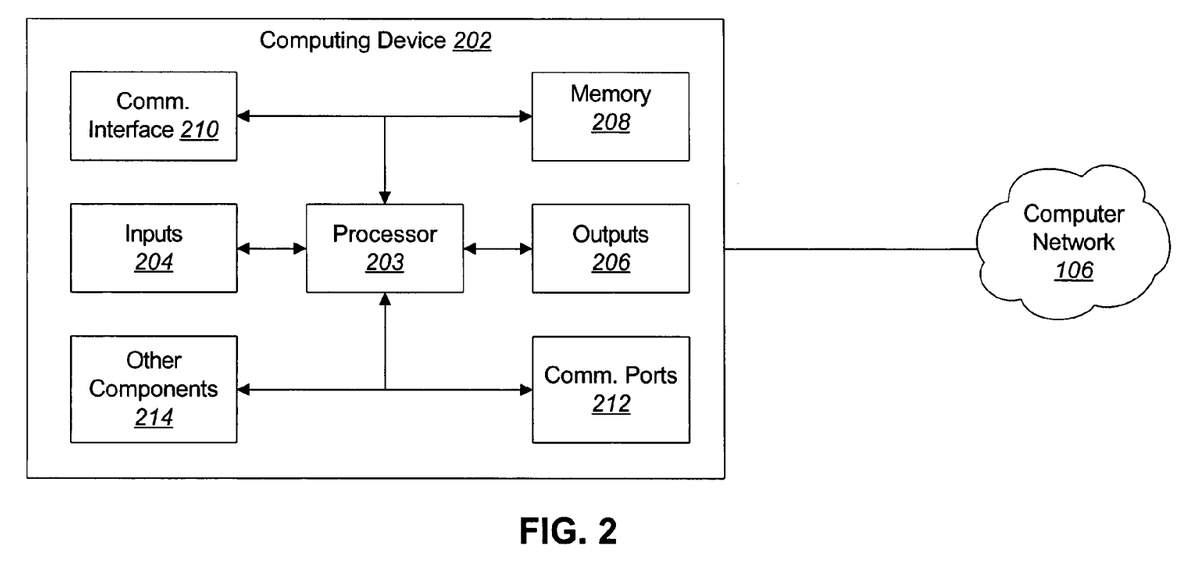
FIG. 2 is a block diagram illustrating the major hardware components typically utilized in a computing device used with embodiments herein.

Many different kinds of computing devices may be used on computer networks. FIG. 2 is a block diagram illustrating the major hardware components typically utilized with embodiments herein. The systems and methods disclosed may be used with a computing device 202 that communicates with other devices via a computer network 106. Computing devices 202 are known in the art and are commercially available. The major hardware components typically utilized in a computing device 202 are illustrated in FIG. 2. A computing device 202 typically includes a processor 203 in electronic communication with input components or devices 204 and/or output components or devices 206. The processor 203 is operably connected to input 204 and/or output devices 206 capable of electronic communication with the processor 203, or, in other words, to devices capable of input and/or output in the form of an electrical signal. Embodiments of devices 202 may include the inputs 204, outputs 206 and the processor 203 within the same physical structure or in separate housings or structures.

The electronic device 202 may also include memory 208. The memory 208 may be a separate component from the processor 203, or it may be on-board memory 208 included in the same part as the processor 203. For example, microcontrollers often include a certain amount of on-board memory.

The processor 203 is also in electronic communication with a communication interface 210. The communication interface 210 may be used for communications with other devices 202. Thus, the communication interfaces 210 of the various devices 202 may be designed to communicate with each other to send signals or messages between the computing devices 202.

The computing device 202 may also include other communication ports 212. In addition, other components 214 may also be included in the electronic device 202.

Of course, those skilled in the art will appreciate the many kinds of different devices that may be used with embodiments herein. The computing device 202 may be a one-chip computer, such as a microcontroller, a one-board type of computer, such as a controller, a typical desktop computer, such as an IBM-PC compatible, a router, a host, a Personal Digital Assistant (PDA), a Unix-based workstation, etc. Accordingly, the block diagram of FIG. 2 is only meant to illustrate typical components of a computing device 202 and is not meant to limit the scope of embodiments disclosed herein.

The current Internet Protocol version is known as IPv4 (IP Version 4). IPv4 uses 32 bits to represent an address. Because of the rapid growth of the Internet the IPv4 address space will eventually be exhausted. The new version of Internet Protocol is known as IPv6 (IP Version 6). IPv6 uses 128 bits to represent an address. In addition to an increased number of IP addresses, IPv6 aims to support simpler configurations, provide security at the IP level and to provide better support for quality of service (QOS).

The migration from IPv4 to IPv6 will not be an immediate process, but will take some period of time to accomplish. Thus during the transition period, the IPv4 and IPv6 protocols need to coexist. IPv6 is designed to support this migration from IPv4. RFC 2893, Gilligan R., and Nordmark E., "Transition Mechanisms for IPv6 Hosts and Routers," August 2000, defines IPv4 compatibility mechanisms for IPv6 hosts and routers. Some mechanisms to achieve this compatibility are tunneling, a dual IP stack and the domain name system.

Regarding tunneling, IPv6 packets can be tunneled over IPv4 routing infrastructure that currently exists. This is done by encapsulating IPv6 packets with an IPv4 header and setting the source and destination address fields of IPv4 header to end points of the tunnel.

A dual IP stack may also help with IPv4 compatibility. Systems may be made to support implementations of both IPv6 and IPv4 stacks on IPv6 nodes.

Changes to domain name systems (DNS) may also assist in IPv4 compatibility. The DNS infrastructure may be upgraded to support name-to-address and address-to-name resolution of IPv4 and IPv6 nodes.

Currently the number of existing IPv4 applications is greater than the number of IPv6 applications. One way to enable IPv4 applications to work with IPv6 is to modify the IPv4 applications to use the newer IPv6 API. However, modifying the IPv4 applications may not be feasible in all cases. For example, the source code may not be available or may be lost for these applications. In addition, changing the IPv4 applications assumes that there is an IPv6 stack available for the particular operating system on which these applications run. This may not be true in all the cases. For example, for some embedded applications, their operating system may not have support for an IPv6 stack. In such situations a solution which allows the existing IPv4 applications to communicate with IPv6 hosts without making any modifications to the source code of the IPv4 applications is desirable. There are several possible approaches to achieve this including a Bump-In-the-Stack (BIS), and a Bump-In-the-API (BIA).

The BIS approach works by intercepting the data flow between the TCP/IPv4 layer and the network card driver module and translating IPv4 to IPv6 and vice-a-versa. The BIA approach provides a translation mechanism between the IPv4 APIs and IPv6 APIs.

The BIS approach has the following drawbacks. In the BIS scenario, IPv4 headers are added first by the TCP/IPv4 stack, then the BIS module intercepts packets and adds IPv6 headers, this involves extra overhead because the IPv4 headers are first added and then they are replaced by the IPv6 headers. The BIS module needs to intercept packets between the IPv4 stack and the network driver, which may not be supported by the operating system or network driver architecture. If a system tries to use the BIS and the operating system or network driver does not support the BIS operation, the system may become unstable or otherwise unusable while attempting to use the unsupported BIS.

The BIA approach has the following drawbacks. The BIA needs an IPv6 stack installed on the host, which is running an IPv4 application. However, an IPv6 stack may not be available for all the operating systems.

The systems and methods herein provide an API level translator (ALT) approach, which can allow an existing IPv4 application to communicate with IPv6 hosts. This approach does not require capturing packets in the stack level and also works even if there is no IPv6 stack installed on the host. The systems and methods disclosed herein provide several benefits for IPv4 applications to communicate to IPv6 hosts. This approach works even when there is no IPv6 stack installed (e.g., if an IPv6 stack does not exist for the system). Unlike with the BIS approach, the systems herein do not need to add IP headers twice. Furthermore, the embodiments disclosed do not need to capture packets between the IP stack and network card driver (as is the case for BIS approach).

The systems and methods herein enable existing IPv4 applications to communicate with IPv6 hosts. In understanding the embodiments below, it may be beneficial to briefly describe the BIS and BIA approaches.

Figure 3:
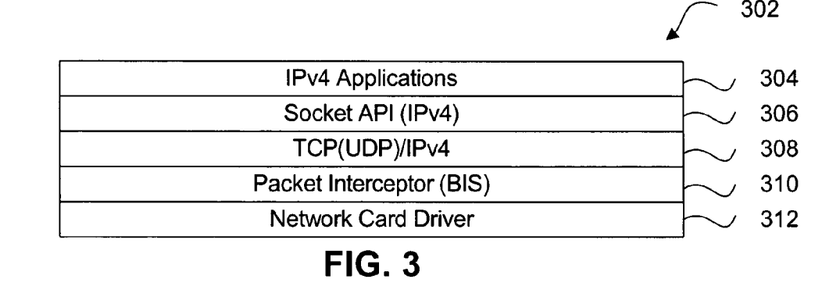
FIG. 3 illustrates the overall structure of the Bump-In-the-Stack (BIS) approach.

FIG. 3 shows the overall structure of the Bump-In-the-Stack (BIS) approach 302. IPv4 Applications 304 are at the highest layer. IPv4 applications 304 are above the socket API (IPv4) 306. The socket API (IPv4) 306 sits above TCP(UDP)/IPv4 308. The BIS works by adding an extra layer between the TCP/IPv4 layer 308 and the network card driver layer 312. This new layer is the packet interceptor (BIS) layer 310. In this layer 310 the packets are intercepted and the outgoing packets are translated from IPv4 to IPv6 and the incoming packets are translated from IPv6 to IPv4.

Figure 4:
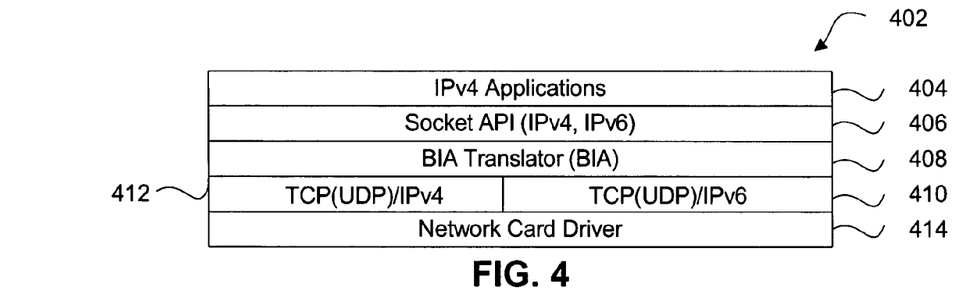
FIG. 4 illustrates the overall structure of the Bump-In-the-API (BIA) approach.

FIG. 4 shows the overall structure of the Bump-In-the-API (BIA) approach 402. IPv4 Applications 404 are at the highest layer. IPv4 applications 404 are above the socket API (IPv4, IPv6) 406. As shown in the figure, the BIA approach maps each IPv4 socket API into the IPv6 socket API. Thus, the BIA translator 408 intercepts the socket function calls. For BIA approach to work an IPv6 stack 410 needs to be available for the operating system and installed. As a result, the BIA approach will not work if there is no IPv6 stack 410 available.

Figure 5:
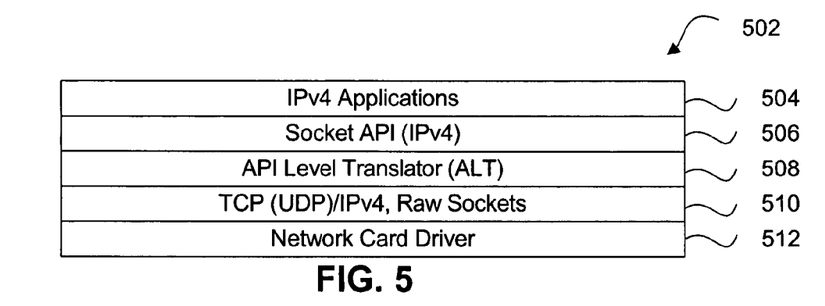
FIG. 5 illustrates the API Level Translator structure.

FIG. 5 shows the API Level Translator structure 502. IPv4 applications 504 are at the highest layer. IPv4 applications 504 are above the socket API (IPv4) 506. As can be seen from FIG. 5, in the API Level Translator approach IPv4 socket function calls are intercepted. However, since there is not an IPv6 stack (as is the case for BIA), it maps each function call to use raw sockets 510, supplies its own IP headers (for "send" operations) and uses the IPv4 stack 510 functionality. The following description gives details about the API Level Translator approach. As shown, the API Level Translator 508 may work on any system which supports raw sockets and the IP_HDRINCL or equivalent socket option, which allows supplying IP headers.

Figure 6:
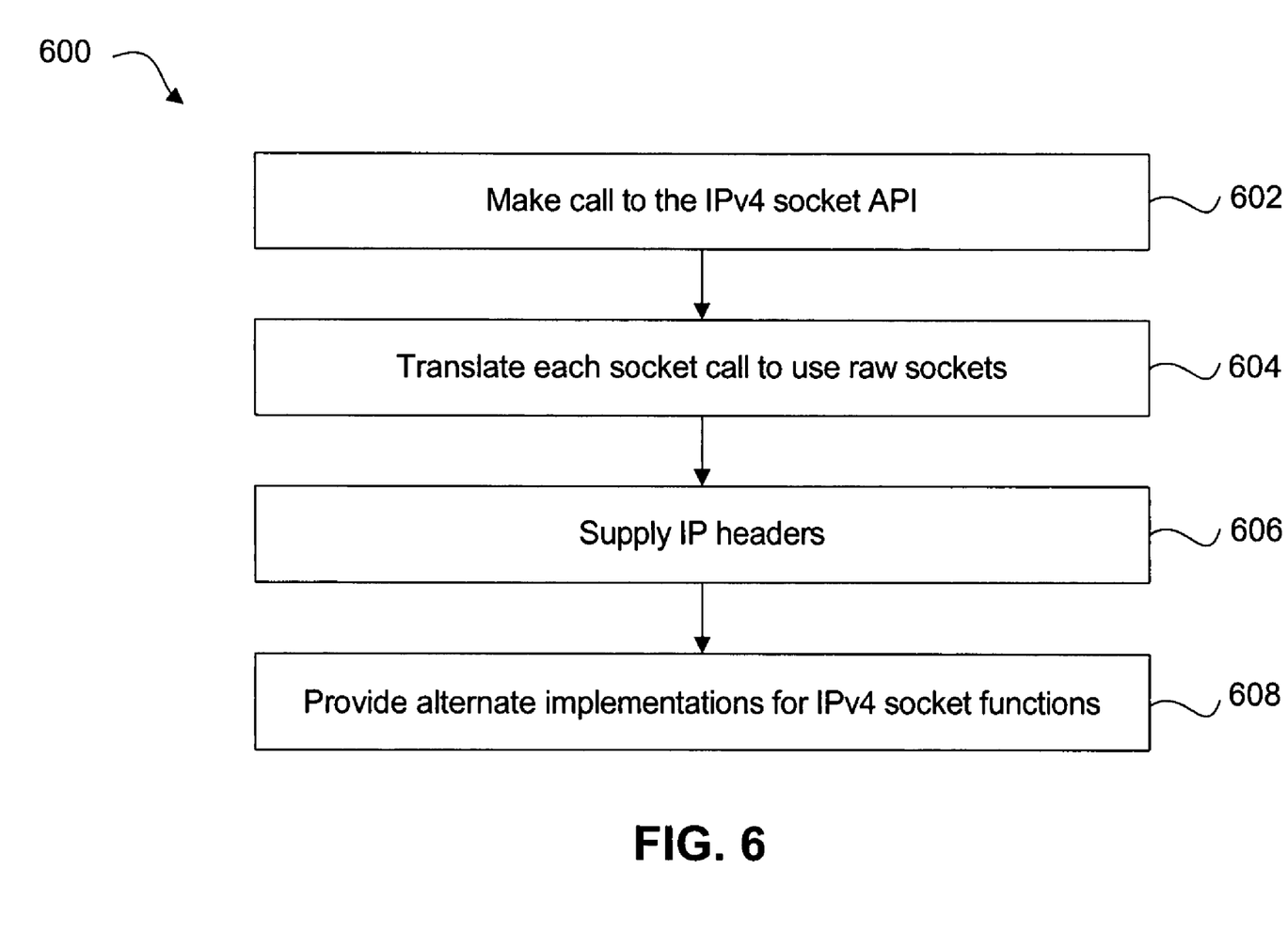
FIG. 6 is a flow diagram illustrating a general method to implement the API Level Translator.

FIG. 6 is a flow diagram illustrating a general method to implement the API Level Translator. When sending data, an IPv4 application makes 602 a call to the IPv4 socket API. Each socket call is translated 604 to use raw sockets (SOCK_RAW option). The method supplies 606 its own IP headers. In one embodiment, this may be done by setting the socket option on the raw socket to supply IP headers (setsockopt function, IP_HDRINCL option). Then the method provides 608 alternate implementations for IPv4 socket functions.

In providing alternate implementations for IPv4 socket functions, the following guidelines may be followed. The guidelines may be used for transmission and reception related functions (e.g. sendto, send, recvfrom, recv).

Figure 7:
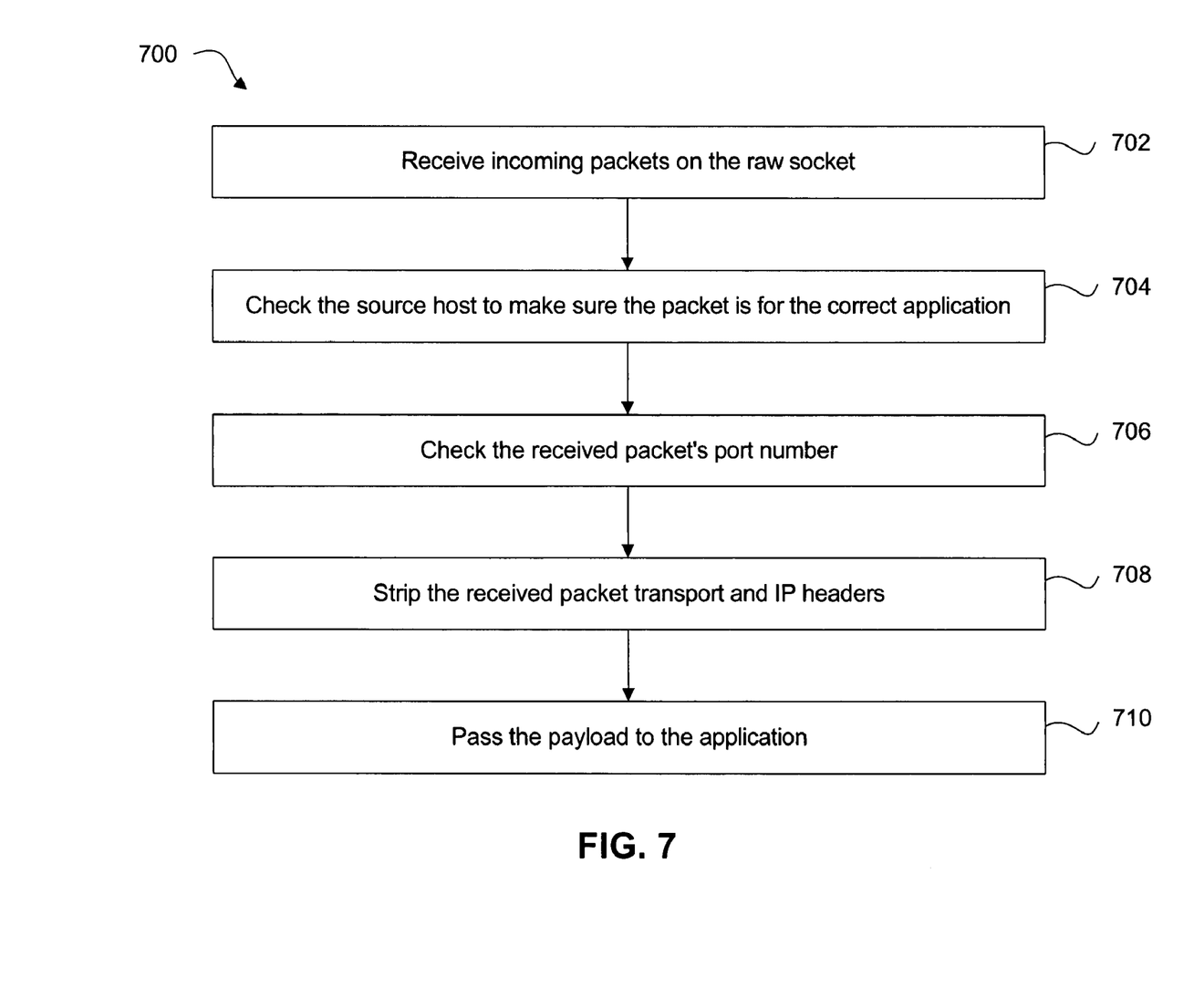
FIG. 7 is a flow diagram illustrating a method for receiving data.

FIG. 7 is a flow diagram illustrating a method 700 for receiving data. When receiving data, the system may receive 702 incoming packets on the raw socket. If required, the source host may be checked 704 to make sure the packet is for the correct application. The received packet's port number may be checked 706. Then the system may strip 708 the received packet transport and IP headers and pass 710 the payload to the application.

Tunneling may be used. Depending upon the raw socket behavior, the IPv6 packet may be created in such a way that "host to router" tunneling is used. For UDP and ICMP protocols, sending and receiving packets using the systems herein will be appreciated by those skilled in the art. For the TCP protocol, a user level TCP implementation may be used.

Figure 9:
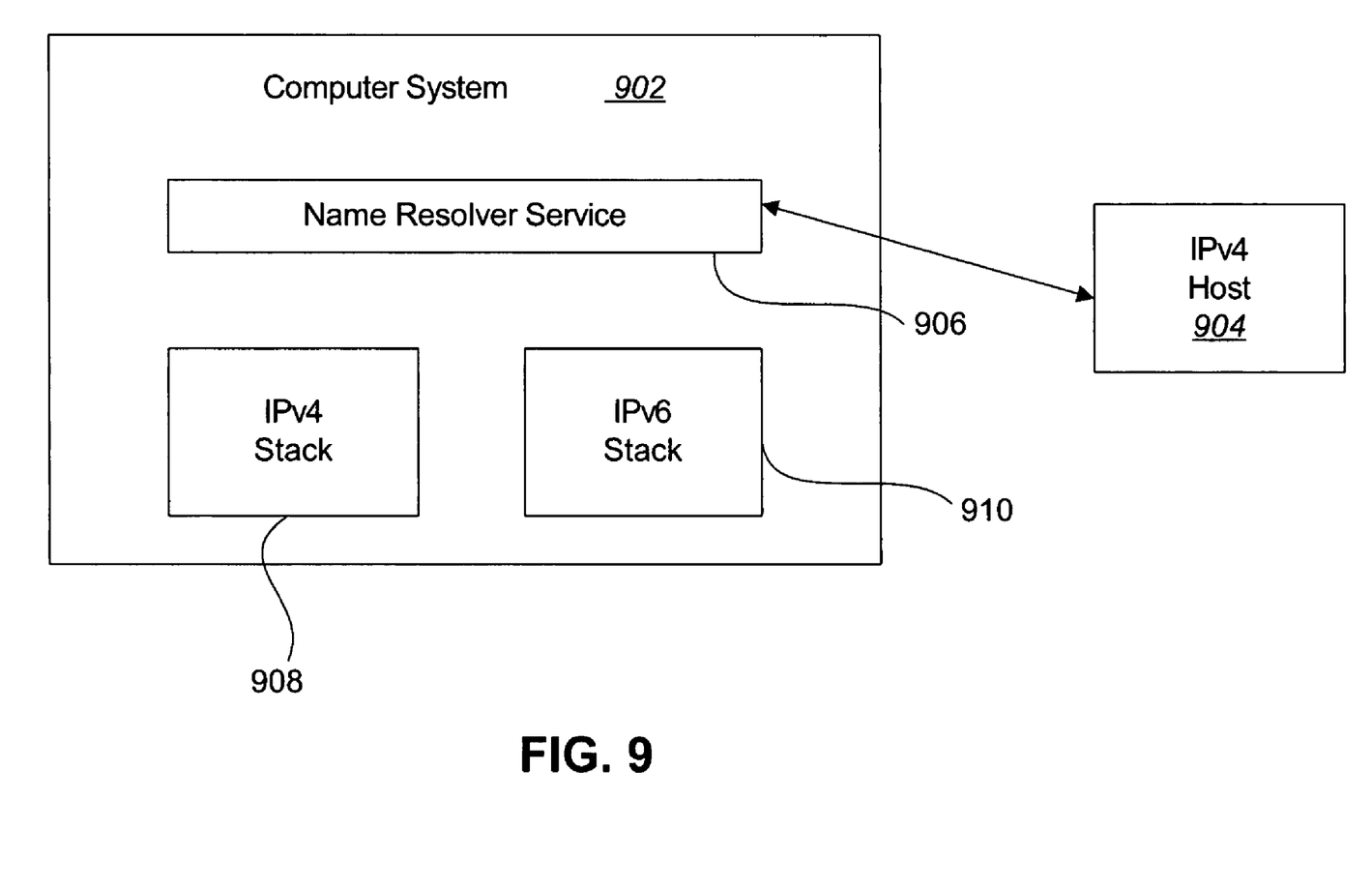
FIG. 9 is a block diagram illustrating a name resolver service.

For name to address resolution related functions (e.g. gethostbyname, gethostbyaddr, inet_addr) one of the following two approaches can be used. The first approach is to use the approach used by BIS. That is, to use an extension name resolver and an address mapper as in the BIS. The second approach is to define and use a "Name Resolver" service, as illustrated in FIG. 9. A "Name Resolver" service 906 may run on a separate host 902 which has both IPv6 and IPv4 stacks 910, 908. The intercepted name to address resolution functions on the IPv4 only host 904 may lookup this "Name Resolver" service 906 and send a query to it. The service 906 may use newer name to address resolution functions using its IPv6 stack 910 (e.g. getaddrinfo, getnameinfo, etc.) and send back the AAAA record it obtained for the query to the IPv4 only host 904. This AAAA record will now be associated with the particular hostname or IPv4 address query and will be stored in the API level translator (ALT) address resolution module. This mapping will be used to supply appropriate IPv6 headers for all destination addresses matching the corresponding destination hostname or destination IPv4 address. The source IPv4 address can be mapped to an IPv6 address based on the recommendation from RFC 2765 (Stateless IP/ICMP Translation Algorithm—(SIIT)—Nordmark E., Sun Microsystems "Stateless IP/ICMP Translation Algorithm (SIIT)," RFC 2765, February 2000.

The description below illustrates the sequence of steps in the BIS, BIA and ALT approaches to further illustrate the differences between them. Consider the case where the IPv4 application wants to send some data. In the BIS approach, the IPv4 application makes an IPv4 socket API call to send the data. This data is passed to the IPv4 stack by the IPv4 socket API. The IPv4 stack puts the transport and IPv4 headers on it. The stack also performs other functions and passes the IPv4 packet to the layer below. The BIS packet interceptor intercepts this IPv4 packet and translates it into an IPv6 packet. It will then pass the packet to the network card driver.

In the BIA approach, the IPv4 application makes an IPv4 socket API call to send the data. The BIA module intercepts this function call and instead calls a corresponding IPv6 socket API function. The data will thus be passed to the IPv6 stack, which will add appropriate transport and IPv6 headers. The IPv6 stack may also perform other functions and will pass the IPv6 packet to the network card driver 414.

Figure 8:
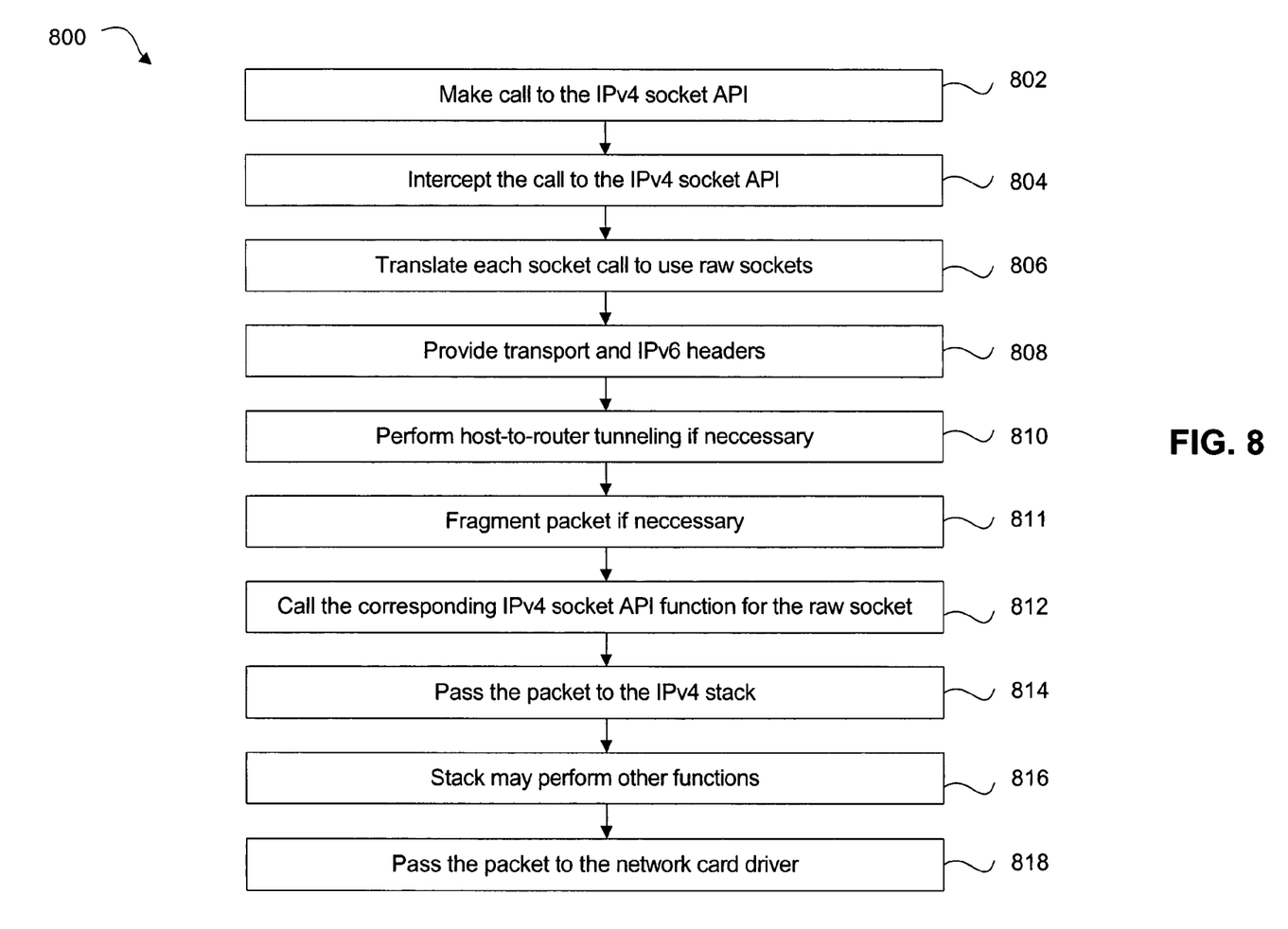
FIG. 8 is a flow diagram illustrating a method for an IPv4 application to send data using the API Level Translator.

FIG. 8 is a flow diagram illustrating a method 800 for an IPv4 application to send data using the ALT approach. In the ALT approach, the IPv4 application makes 802 an IPv4 socket API call to send the data. The ALT module intercepts 804 this function call. It has already mapped 806 the corresponding socket to a raw socket. The ALT provides 808 the appropriate transport and IPv6 headers. If necessary, it will perform 810 host-to-router tunneling. If necessary, it will fragment the packet 811. It will then call 812 the corresponding IPv4 socket API function for the raw socket and will pass 814 the packet to the IPv4 stack. The stack may perform 816 other functions (other than adding transport and IP headers) and will pass 818 the packet to the network card driver 512.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for a computer system for providing communication between a first system and a second system, wherein the first system uses IPv4 (Internet Protocol version 4) and the second system uses IPv6 (Internet Protocol version 6), the method comprising:
   providing an IPv4 application on the first system;
   inserting an Application Programming Interface (API) level translator layer, wherein the API level translator layer is implemented without using an IPv6 stack;
   making a function call to a socket API for IPv4;
   intercepting the function call by the API level translator layer, wherein interception of the function call is not required to occur after a packet is passed to an IPv4 stack;
   translating the function call to a translated function call wherein the translated function call uses raw sockets;
   making a function call to the socket API for the translated function call that uses raw sockets;
   setting the socket option on a raw socket to supply new IP headers;
   passing the packet to the IPv4 stack;
   providing an alternate implementation for a sending-related IPv4 socket function, wherein the alternate implementation comprises:
      intercepting an IPv4 socket API call to send a packet;
      translating the IPv4 socket API call to use a raw socket;
      providing transport and IPv6 headers ahead of user supplied payload data;
      fragmenting the packet as required;
      calling a corresponding IPv4 socket API function for the raw socked; and
      passing the packet to the IPv4 stack; and
   providing an alternate implementation for a reception-related IPv4 socket function, wherein the alternate implementation comprises:
      receiving an incoming packet on a raw socket;
      checking a source host to determine the proper destination for the incoming packet as required;
      checking a port number for the incoming packet;
      stripping transport and IP headers from the incoming packet; and
      passing a payload to the IPv4 application.

2. The method of claim 1, further comprising supplying IP headers only once.

3. The method of claim 1, wherein the method is implemented by inserting an API level translator layer between a socket API layer and a TCP/IPv4 layer.

4. The method of claim 2, further comprising passing the packet to a network card driver.

5. The method of claim 1, further comprising performing tunneling of IPv6 packets over IPv4 routing infrastructure.

6. The method of claim 1, further comprising using a Name Resolver service to perform name to address resolution related functions.

7. The method of claim 6, wherein the Name Resolver service is configured to run on a separate host that includes an IPv4 stack and an IPv6 stack.

8. The method of claim 7, wherein name to address resolution functions of the Name Resolver service use the IPv6 stack.

9. The method of claim 8, wherein the Name Resolver service is further configured to receive a query from the first system, use the address resolution functions to obtain a record and send the record to the first system.

10. The method of claim 1, further comprising passing the packet to a network card driver.

11. A set of executable instructions on a computer readable medium for providing communication between an IPv4 (Internet Protocol version 4) system and an IPv6 (Internet Protocol version 6) system, the instructions being configured to:
   provide an IPv4 application on the IPv4 system;
   insert an Application Programming Interface (API) level translator layer, wherein the API level translator layer is implemented without using an IPv6 stack;
   make a function call to an IPv4 socket API;
   intercept the function call by the API level translator layer, wherein interception of the function call is not required to occur after a packet is passed to an IPv4 stack;
   translate the function call to a translated function call wherein the translated function call uses raw sockets;
   make another function call to the IPv4 socket API for the translated function call that uses raw sockets;
   set the socket option on a raw socket to supply new IP headers;
   pass the packet to the IPv4 stack;
   provide an alternate implementation for a sending-related IPv4 socket function, wherein the alternate implementation comprises:
      intercepting an IPv4 socket API call to send a packet;
      translating the IPv4 socket API call to use a raw socket;
      providing transport and IPv6 headers ahead of user supplied payload data;
      fragmenting the packet as required;
      calling a corresponding IPv4 socket API function for the raw socket; and
      passing the packet to the IPv4 stack; and
   provide an alternate implementation for a reception-related IPv4 socket function, Wherein the alternate implementation comprises:
      receiving an incoming packet on a raw socket;
      checking a source host to determine the proper destination for the incoming packet as required;
      checking a port number for the incoming packet;
      stripping transport and IP headers from the incoming packet; and
      passing a payload to the IPv4 application.

12. The set of executable instructions of claim 11, further comprising supplying IP headers only once.

13. The set of executable instructions of claim 11, wherein the instructions are implemented by inserting an API level translator layer between a socket API layer and a TCP/IPv4 layer.

14. The set of executable instructions of claim 11, further comprising performing tunneling of IPv6 packets over IPv4 routing infrastructure.

15. The set of executable instructions of claim 11, further comprising passing the packet to a network card driver.

16. A system for enabling an IPv4 (Internet Protocol version 4) application to communicate across a computer network using an IPv6 (Internet Protocol version 6) system, the system comprising:
   a computing device;
   executable instructions executable on the computing device, wherein the executable instructions are configured to:
      insert an Application Programming Interface (API) level translator layer, wherein the API level translator layer is implemented without using an IPv6 stack;
      make a function call to an IPv4 socket API;
      intercept the function call by the API level translator layer, wherein interception of the function call is not required to occur after a packet is passed to an IPv4 stack;
      translate the function call to a translated function call wherein the translated function call uses raw sockets;
      make another function call to the IPv4 socket API for the translated function call that uses raw sockets;
      set the socket option on a raw socket to supply new IP headers;
      pass the packet to the IPv4 stack;
      provide an alternate implementation for a sending-related IPv4 socket function,
         wherein the alternate implementation comprises:
         intercepting an IPv4 socket API call to send a packet;
         translating the IPv4 socket API call to use a raw socket;
         providing transport and IPv6 headers ahead of user supplied payload data;
         fragmenting the packet as required;
         calling a corresponding IPv4 socket API function for the raw socket; and
         passing the packet to the IPv4 stack; and
      provide an alternate implementation for a reception-related IPv4 socket function, wherein the alternate implementation comprises:
         receiving an incoming packet on a raw socket;
         checking a source host to determine the proper destination for the incoming packet as required;
         checking a port number for the incoming packet;
         stripping transport and IP headers from the incoming packet; and
         passing a payload to the IPv4 application.

17. The system of claim 16, further comprising an API level translator layer between a socket API layer and a TCP/IPv4 layer.

18. The system of claim 16, further comprising performing tunneling of IPv6 packets over IPv4 routing infrastructure.

* * * * *

UNITED STATES PATENT AND TRADEMARK OFFICE
CERTIFICATE OF CORRECTION

PATENT NO. : 7,340,746 B2  Page 1 of 1
APPLICATION NO. : 10/637408
DATED : March 4, 2008
INVENTOR(S) : Sachin G. Deshpande It is certified that error appears in the above-identified patent and that said Letters Patent is hereby corrected as shown below:

Column 9, line 56, please replace "socked" with --socket--.

Column 10, line 57, please replace "Wherein" with --wherein--.

Signed and Sealed this

Twenty-second Day of July, 2008

JON W. DUDAS
*Director of the United States Patent and Trademark Office*